(12) United States Patent
Ulrich et al.

(10) Patent No.: US 10,321,474 B2
(45) Date of Patent: Jun. 11, 2019

(54) METHOD FOR DATA TRANSMISSION IN A CELLULAR NETWORK WITH A MACHINE TYPE COMMUNICATION DEVICE

(71) Applicant: GEMALTO M2M GMBH, Munich (DE)

(72) Inventors: Thomas Ulrich, Bad Dürkheim (DE); Lars Wehmeier, Falkensee (DE); Volker Breuer, Boetzow (DE)

(73) Assignee: GEMALTO M2M GMBH, Munich (DE)

( * ) Notice: Subject to any disclaimer, the term of this patent is extended or adjusted under 35 U.S.C. 154(b) by 44 days.

(21) Appl. No.: 15/534,284

(22) PCT Filed: Nov. 26, 2015

(86) PCT No.: PCT/EP2015/077743
§ 371 (c)(1),
(2) Date: Jun. 8, 2017

(87) PCT Pub. No.: WO2016/091602
PCT Pub. Date: Jun. 16, 2016

(65) Prior Publication Data
US 2018/0242338 A1   Aug. 23, 2018

(30) Foreign Application Priority Data
Dec. 12, 2014   (EP) .................................... 14197728

(51) Int. Cl.
*H04L 1/18* (2006.01)
*H04W 4/70* (2018.01)
(Continued)

(52) U.S. Cl.
CPC ......... *H04W 72/121* (2013.01); *H04L 1/1887* (2013.01); *H04W 4/70* (2018.02); *H04W 72/0413* (2013.01); *H04W 76/28* (2018.02)

(58) Field of Classification Search
CPC ........... H04W 72/121; H04W 72/0413; H04W 76/28; H04W 4/70; H04L 1/1887; H04Q 7/00
See application file for complete search history.

(56) References Cited

U.S. PATENT DOCUMENTS 10,057,824 B2 *   8/2018   Larmo ............... H04W 36/0088
2007/0159994 A1 *   7/2007   Brown ............... H04W 52/0216
370/324

(Continued)

OTHER PUBLICATIONS

International Search Report (PCT/ISA/210) dated Feb. 16, 2016, by the European Patent Office as the International Searching Authority for International Application No. PCT/EP2015/077743.

(Continued)

*Primary Examiner* — Afsar M Qureshi
(74) *Attorney, Agent, or Firm* — Buchanan Ingersoll & Rooney PC

(57) ABSTRACT

A cellular network comprises a plurality of base nodes, including an active base node, to which the wireless device is currently associated. The wireless device transmits data according to a periodicity related transmission mode to the active base node. The method comprises
providing information from wireless device to the active base node relating to periodicity of said data transmission,
responding at the active base node comprising an indication of assigned resources for multiple transmissions,
setting a timer at the active base node relating to said periodicity,
upon expiration of the timer, reserving resources at the active base node for reception of the data transmission,
transmitting data from the wireless device according to the periodicity,
receiving transmitted data at active base node, (Continued)

conducting an acknowledging procedure at the active base node in response to said data reception.

15 Claims, 6 Drawing Sheets

(51) Int. Cl.
*H04W 72/04* (2009.01)
*H04W 72/12* (2009.01)
*H04W 76/28* (2018.01)

(56) References Cited

U.S. PATENT DOCUMENTS

| | | | |
|---|---|---|---|
| 2011/0292893 A1 | 12/2011 | Lee et al. | |
| 2012/0204094 A1* | 8/2012 | Liang | G06F 11/3495 715/234 |
| 2012/0224477 A1* | 9/2012 | Balasubramanian | H04L 45/125 370/230 |
| 2013/0016602 A1* | 1/2013 | Diachina | H04L 1/0009 370/216 |
| 2013/0242825 A1 | 9/2013 | Farhadi et al. | |
| 2014/0003262 A1* | 1/2014 | He | H04W 28/08 370/252 |
| 2014/0010187 A1* | 1/2014 | Huang | H04W 4/005 370/329 |
| 2015/0087287 A1* | 3/2015 | Pinheiro | H04W 76/046 455/418 |
| 2017/0085490 A1* | 3/2017 | Sachs | H04L 47/2475 |
| 2017/0195891 A1* | 7/2017 | Smith | H04W 16/14 |
| 2017/0238136 A1* | 8/2017 | Smith | H04W 4/029 455/456.3 |
| 2017/0339670 A1* | 11/2017 | Chae | H04W 72/0446 |
| 2018/0352547 A1* | 12/2018 | Tabet | H04L 1/1812 |

OTHER PUBLICATIONS

Written Opinion (PCT/ISA/237) dated Feb. 16, 2016, by the European Patent Office as the International Searching Authority for International Application No. PCT/EP2015/077743.

* cited by examiner

METHOD FOR DATA TRANSMISSION IN A CELLULAR NETWORK WITH A MACHINE TYPE COMMUNICATION DEVICE

FIELD OF THE INVENTION

The present invention relates to a method for data transmission from a wireless device in a cellular network, in particular for a machine type communication device in a long term evolution network.

The invention also pertains to a wireless device and a base node using said method.

BACKGROUND OF THE INVENTION

Generally, in the field of wireless communication the technology of long term evolution (LTE) is being standardized by the 3GPP as a technology allowing higher bandwidth with reduced latencies, in particular in order for allowing the introduction of new services with higher data needs than offered by the available cellular networks supporting 2G (GSM, GPRS, EDGE) or 3G (UMTS, HSPA). At the same time there are tendencies of the network operators to reduce the number of maintained cellular network standards. At long sight it is expected that at least one of the legacy networks will be switched off.

This situation is of course incompatible with the growing trend of machine type communication (MTC) devices. Those devices are typically machines like vending machines or electricity meters which regularly communicate via the cellular network with remote servers, and they are preferably designed for rarely sending small amounts of data. The MTC devices are usually equipped with a wireless module incorporating all required components for conducting all signaling exercises with the cellular network they are operating in.

From a cost perspective a machine type communication device like the mentioned examples would merely be attractive if a LTE capable wireless module would be incorporated. At the same time there are by now already millions of MTC devices in the field, which would need to switch to LTE, if the supporting legacy networks would be switched off.

Hence the problem arises, that the LTE standard is designed for large data transmission and reception, both in the uplink and the downlink direction. Those data transmissions are accompanied by an amount of overhead signaling, which is merely remarkable compared to the expected amount of transmitted data of common wireless devices like mobile handsets. However, if the expected millions of MTC devices would switch to LTE standard, the present LTE capable networks would be overwhelmed with regular signaling load, in particular in the uplink direction, although the payload is extremely low. For the available LTE networks this situation would put their stability at risk, plus the cost of an increase of capacity in the cellular networks is hardly covered by the payload related income.

There is therefore a need for an adaptation of the LTE standard in order to support low cost wireless devices, in particular MTC devices, which regular send data to the LTE network components, with the goal to better use the cellular network capacities.

It is therefore the goal of present invention to overcome the addressed situation and to propose a solution for an improved uplink communication protocol between a wireless device and a LTE capable network.

Further alternative and advantageous solutions would, accordingly, be desirable in the art.

SUMMARY OF THE INVENTION

For this it is according to a first aspect of the invention suggested a method for data transmission in a cellular network from a wireless device according to claim 1. It is further proposed according to a second aspect a base node of the cellular network according to claim 8. It is further suggested according to a third aspect of the invention a wireless device according to claim 12.

It is therefore proposed according to the first aspect of the invention a method for data transmission in a cellular network from a wireless device, the cellular network comprising a plurality of base nodes, the plurality of base nodes comprising an active base node, which is the base node the wireless device is currently associated to, the wireless device being configured to transmit data according to a periodicity related transmission mode to the active base node, the method comprises the steps of:

providing information from wireless device to the active base node relating to periodicity of said data transmission, responding at the active base node to the wireless device comprising an indication relative to assigned resources for multiple transmissions, setting a timer at the active base node relating to said periodicity, upon expiration of the timer, reserving resources at the active base node for reception of the data transmission from the wireless device, transmitting data from the wireless device to the active base node according to the periodicity, receiving transmitted data at active base node, conducting an acknowledging procedure at the active base node in response to said data reception.

The inventive method is dedicated for a wireless device which is regularly transmitting in particular a similar amount of data to a remote server and is in particular moreover stationary. An example for such a wireless device is a metering device which periodically transmits its measurements at a defined time, or at least in a defined corridor of time. This periodicity is preferably in the range from seconds up to days, depending upon the purpose of the wireless device. The more frequent the data transmissions are, the higher is the need to follow the inventive method, in particular in case of many wireless devices transmitting data according to the same periodicity.

According to the invention one wireless device which is configured to send data in a periodicity related manner, camps on a base node of a cellular network, which is the active base node from the perspective of the wireless device.

Either directly with the signaling related to camping, or after operating a while in association with the active base node, the wireless device provides information to the active base node about the periodicity of data transmissions. It is in particular advantageous that a wireless device like a metering device is put into the field and executes some installation tasks including data exchange with the remote server, before it starts its regular operation. Once the regular operation is about to be started, the inventive method is advantageously started.

The wireless device in particular provides information regarding start time, repetition time, expected amount of data etc. to the base node.

When the base node receives information relating to the periodicity of data transmission, it is first to be checked if the base node is capable of supporting this transmission scheme. If not then the normal scheduling based data transmission, which requires resource request prior to each data transmission, is continued.

Otherwise the base node responds to the wireless device with a message comprising information for the wireless device relating to assigned resources, which are to be used for each of the periodic data transmissions.

Preferably this information comprises at least one out of the group of:
 a time based submission pattern, and/or
 at least one resource block, and/or
 the assigned size of a resource block per transmission.

With that the wireless device is preferably made aware from the base node in which resource block to provide the data and up to which amount. This in particular includes an indication if the full resource block is usable for the wireless device or only a limited amount of resource elements of the resource block.

Further the base node is preferably configured to define the time based submission pattern, in particular when it is on the side of the base node to decide about the accurate time of transmission.

Preferably the method further comprises for the wireless device providing information relating to periodicity of said data transmission in conjunction with a data transmission in a non-periodicity transmission mode, and said information relating to periodicity comprising a time related offset relative to said data transmission.

With that the wireless device defines a point in time and an offset compared to that point in time. The point in time in this embodiment is the current transmission. The current transmission is provided in non-periodicity transmission mode, in particular in normal scheduling based transmission scheme. Preferably said offset relates to the frame structure, in particular it depicts a system frame number (SFN).

The active base node then prepares itself for the expected future data transmissions. This starts at first with a setting of the timer according to the periodicity. When the timer expires, resources are allocated for one data transmission expected from the wireless device. The wireless device itself of course probably also sets a timer or the like, and then conducts the data transmission according to the periodicity, and for which the active base node is ready to receive.

The big advantage of this approach is that the wireless device does not need to request resources from the base node first for each data transmission.

As it is known in the art the requested resources are granted by the base node with another message submitted to the wireless device. Further accompanying signaling is additionally possible. Due to the fact that the base node already knows about when and how much data are to be expected, base node and wireless device are according to the inventive method synchronized and do not have to conduct signaling in between.

In case any non-periodicity related transmission is necessary, still the wireless device is preferably capable to make a normal resource request and apply for non-periodicity related data transmission, without necessarily interrupting the periodicity of the regular data transmissions, e.g. of measurements.

In a further advantageous embodiment the wireless device is further configured, after providing said information relating to periodicity of said data transmission, to switch off mobility related measures, and upon reception of a message from the active base node indicating an unsuccessful reception of a data transmission, to switch on mobility related measures.

Such mobility related measures are in particular related to cell-reselection in particular including related measurements of neighboring base nodes for suitable candidates for cell-reselection. This saves for the wireless device resources both in times of processing resources and of power, which matters in case of battery powered wireless devices. In particular stationary wireless devices do not necessarily need to check for available neighboring base nodes, in particular as the wireless device figures out in conjunction with the regular data transmission if the availability of the active base node is still imminent.

At the end of the general process the base node conducts an acknowledging procedure in response to said data reception.

Preferably this comprises in a signaling to the wireless device at the end of the data transmission window. So the wireless device knows directly about if the data transmission was successful.

In particular that acknowledging procedure does not imply in each single case that a response is sent to the wireless device. In particular this happens only every second transmission or more rarely. At the same time the wireless device has to keep all transmitted data, until it is confirmed that the data has successfully arrived at the base node, and hence at the remote server.

This embodiment is in particular applicable to metering devices where each transmission includes the actual value, which is the most recently determined value, and a certain set of previously reported values, hence each information is provided by the transmission information itself multiple times. Therefore it is assured that each value is provided to the destination address, although no immediate acknowledgment is retrieved by the wireless device.

The described procedure is the basic method for one wireless device operating according to the invention. Further optimizations are suggested in case of more than one wireless device operating in the same cell according to the same periodicity scheme.

It is therefore proposed a method wherein the wireless device is part of a group of devices comprising at least one second wireless device, both wireless devices operating in a common periodicity related transmission mode, wherein the method further comprises:
 the wireless device providing information relating to periodicity of said data transmission to the active base node, and
 said at least one second wireless device transmitting data to said active base node according to said periodicity.

This embodiment is advantageous as it handles more than one wireless device and saves even more signaling than the single device solution. The wireless devices are assigned to a group, which is in particular a domain, e.g. the M2M domain, which is a concept for machine-type communication that wireless devices fulfilling a certain operation profile are handled differently than normal handset, by putting them into a domain. Further a subset of the domain, e.g. all wireless devices assigned to one subscriber, is also encompassed by this group.

The method comprises that only one wireless device sends the information relating to periodicity of the data transmission to the active base node, and at least one second wireless device being assigned to the group is operating according to a similar periodicity, too. This in particular includes the options that both wireless devices send in parallel, or alternatively staggered, which means with the same time offset but varying starting point. This embodiment is advantageous as the second wireless device does not need to provide information relating to periodicity of data transmission, but simply send e.g. measured values according to said periodicity.

Preferably the base node sends upon reception of the information provided by the first wireless device a response to the first and the second wireless device.

The second wireless device is in particular already operating according to a periodicity related transmission mode. With the request from the first wireless device the assignment of the wireless devices to signaling resources in particular needs to be changed. This relates in particular to a staggering of the data transmission windows, which might result in a change of the periodicity of the second wireless device. Further this can relate to a sharing of resource blocks between both wireless devices.

Further it is foreseen that the first wireless device sends information for other wireless devices of the group, or the involved base node sends such information and thus informs the other wireless devices on different channels about the assigned resources.

In particular for the case of groups of wireless devices an enhanced way of acknowledgement is foreseen. According to that it is foreseen a method wherein said acknowledging procedure comprises:
examining received data,
in response to examination sending message indicative of the examination result to the first wireless device and to at least one second wireless device being part of said group.

This embodiment comprises that after an analysis of the data received from the first wireless device one or more second wireless devices of the group are also informed. This is in particular advantageous in cases of a non-acknowledgment, in particular when as part of the acknowledging procedure only a message is submitted from the base node to the wireless devices of the group in case of non-acknowledgment. This would lead to a retransmission by all wireless devices of the group receiving the non-acknowledgment message, but effectively this needs fewer resources than transmitting an acknowledgment to each wireless device.

In particular in case of resource sharing, characterized by a resource unit, in particular a resource block, which is shared by a group of devices, an acknowledgment is provided only for the entire resource unit. This preferably fits to the acknowledgement following the periodicity scheme, but is valid for all transmissions of all wireless devices submitting data in said resource unit. In particular all wireless devices of that group are capable of receiving this one acknowledgment directly or indirectly.

According to another embodiment of the invention it is proposed a method further comprising upon reception of a message from the active base node, the message indicating an unsuccessful reception of the data transmission, conducting at the wireless device at least one out of the following measures:
retrying data transmission according to the periodicity, and/or
retrying data transmission according to an additionally indicated resource, an/or
transmitting a message to the active base node indicating an adaptation of the periodicity, and/or
activating said non-periodicity transmission mode involving at least a resource request sent to active base node prior to data transmission.

With this embodiment different measures are foreseen to retry a data transmission once the base node indicates a not successful data transmission. In particular the different measures are used in a cascading manner, which means that in case one of the measures is not successful in particular another measure is conducted.

The retrying of data transmission according to the periodicity is in particular an immediate retry after a single submission in the periodicity related transmission window. Additionally it is not foreseen not to send the whole data but only the missing or incorrectly received parts. This option is in particular already handled on lower layers like the MAC-layer.

The transmission of a message comprising an indication of an adaptation of the periodicity has the goal to modify the time of transmission that way, that in particular times with less network traffic are selected. This might even be possible within a short timeframe, in case a lot of wireless devices sending data at certain peaks, e.g. on the full hour.

In particular an advantageous embodiment of said method comprises that in case the unsuccessfully received data transmission being transmitted by said wireless device and after activating said non-periodicity transmission mode, conducting the step of retransmitting previously transmitted data according to the activated non-periodicity transmission mode from the wireless device to the active base node.

That means, after a switch to normal scheduling based data transmission mode in response to a non-acknowledgement it is foreseen to send again the originally transmitted data.

According to a second aspect of the invention it is proposed a base node of a cellular network, configured to associate a plurality of wireless devices operating in the cellular network, and to receive a data transmission from at least one wireless device, the base node further comprises a timer, the base node being configured to:
receive information from said wireless device relating to periodicity of said data transmission,
transmit in response an indication relative to assigned resources for multiple transmissions to the wireless device,
set the timer relating to said periodicity,
upon expiration of the timer, reserve resources for reception of the data transmission from the wireless device,
receive data transmitted according to said periodicity from said wireless device,
conduct an acknowledging procedure in response to said data reception.

The second aspect of the invention shares the advantages of the first aspect. In a further advantageous embodiment it is suggested a base node which is further configured to receive information from wireless device comprising information relating to amount of expected data transmission, and in response to said received information leaving periodicity related transmission mode.

With this embodiment it is suggested a switch to the periodic data transmission from the base node in response to other data from the wireless device. The information from the wireless device in particular indicates the amount of data which are still to transmit. This is preferably the information that no further data are available to be sent for a foreseeable future. This information is in particular provided by means of the happy-bit as part of uplink control information. The happy-bit typically indicates that no data are available to be sent. In response the base node then can switch off the periodicity related transmission. This is advantageous if for a while no data are pending to be sent. Once the wireless device is in the position to send data again, it then can start again to initiate the periodicity related transmission mode again.

Applying this method is in particular advantageous if larger amounts of data which are non-critical in time can be staggered over a certain time. This is in particular done by a periodic transmission of smaller amounts of data.

It is further suggested according to a second preferable embodiment a base node wherein the base node is further configured to transmit after receiving data an adapted indication relative to assigned resources, the adapted indication comprises information related to at least one out of the group of:

periodicity of transmission, and/or carrier frequency used for transmission and/or assigned size of a resource block per transmission.

According to this embodiment the proposed base node has the capability to adapt the parameter of data transmission for the wireless device. With this the base node has the capability to proactively update the information related to periodicity of the next data transmissions. This is in particular advantageous in case of a non-acknowledgment situation, or whenever the data transmissions need to be adapted, e.g. when another wireless device of the group initiates a periodic data transmission. In the latter case with that means the assignment to resource blocks, carrier e.g. is adapted.

According to a third aspect of the invention it is suggested a wireless device configured to operate with a base node according to the second aspect of the invention, the wireless device further being associated to said base node, the wireless device is configured to conduct transmission of data according to a periodicity related transmission mode to the active base node, said transmission comprises:

to provide information to said base node relating to periodicity of said data transmission, to receive from the base node a response comprising an indication relative to assigned resource for multiple transmissions, to transmit data to the base node according to said periodicity.

The third aspect of the invention shares the advantages of the first and second aspect.

As it is shown this invention advantageously solves the depicted problem and offers a solution which immensely reduces signaling for uplink data transmission of MTC devices.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1a schematically shows a wireless device 10 of the type the present invention is applied to as an embodiment, where the wireless device 10 is in a spatial relationship with a respective base node 4. The wireless device 10 is in particular stationary and a machine-type communication device. That is it is preferably configured to regularly transmit a certain amount of data to a remote server, in particular as electricity metering device, a vending machine or other device for monitoring of a defined situation with sensors.

Figure 1A:
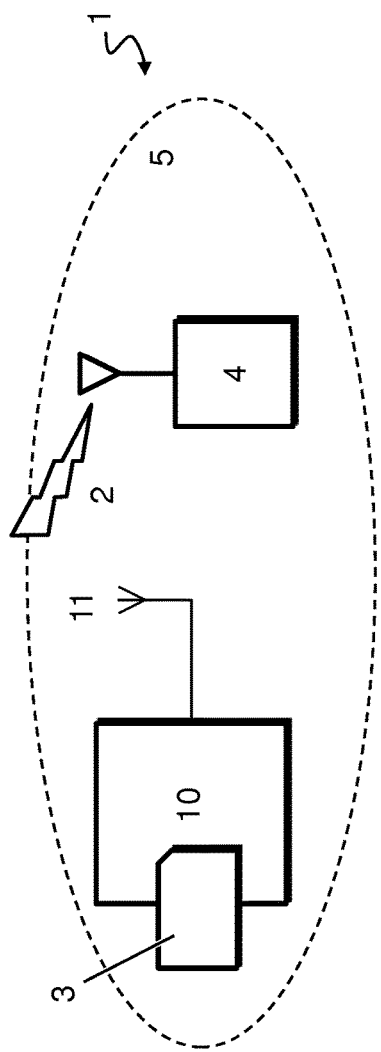
FIG. 1a represents a wireless device of the type to which the present invention is applied as an embodiment in conjunction with a base node according to an embodiment of another aspect of the invention.

The wireless device 10 is dedicated for operating in a cellular network 1. The cellular network 1 comprises a plurality of base nodes 4. Those base nodes 4 are the direct counterparts to the wireless devices 10 on the air interface 2. Such a base node is in particular for cellular networks supporting the LTE technology standard an eNodeB. Compared to previous technology standards eNodeBs cover more functionality and flexibility in terms of scheduling of resources for the assigned wireless devices 10.

The base node 4 supplies in a geographical area of cell 5 connectivity for wireless devices situated in this geographical area. This allows for a wireless device 10 located in the cell 5 to associate with a base node 4, in particular to camp on the base node 4. The wireless device 10 comprises an antenna 11 as connection point to the air interface 2. It further comprises an identification module 3, in particular a SIM card, an UICC, or a soldered identification module, which holds the authentication credentials with which the wireless device registers at the cellular network 1, in particular the base node 4, and which allows the cellular network 1 to figure out if the wireless device 10 is entitled to be served within the cellular network 1, and in particular if it is prepaid or a contract subscription with proven credibility.

Figure 1B:
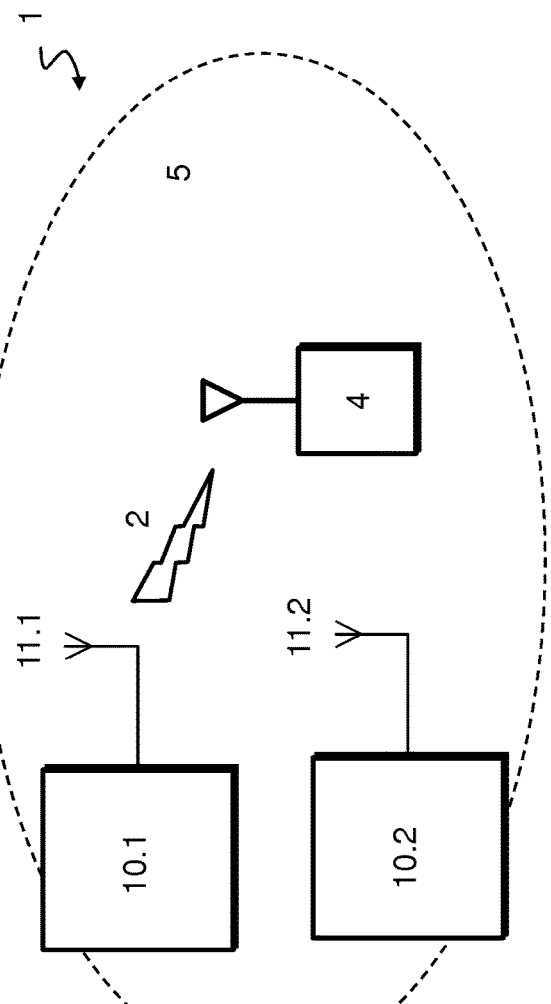
FIG. 1b represents a group of wireless devices of the type to which the present invention is applied as an embodiment in conjunction with a base node according to an embodiment of another aspect of the invention.

FIG. 1b shows for the same cellular network 1 the situation with two wireless devices 10.1, 10.2 camping on base node 4. Both wireless devices 10.1, 10.2 are in particular similar equipped, e.g. with an antenna 11.1, 11.2. Both wireless devices 10.1, 10.2 are part of a group of devices operating in a same manner. Such a group is in particular a group of similar metering devices located in proximity of each other. Their behaviour is principally the same, which means they are both practically stationary and they are transmitting data according to a regular schedule to a remote server connected to the cellular network 1, in particular reachable by internet. Preferably the cellular network 1 is aware of the group identification of the wireless devices. In particular the wireless devices 10.1, 10.2 are part of a domain, in particular the M2M domain. This is typically known to the cellular network 1, preferably by a notice in relationship with the home location register (HLR). In this preferred embodiment a subset of wireless devices 10.1, 10.2 belonging to the M2M domain are assigned to a group in case they are operating within the same cell 5. Further criteria, like a common contract of subscription or a range of IMSI resp. IMEIs are preferably additionally taken into account as criteria to form the assignment of the wireless devices 10.1, 10.2 to a group.

Figure 2:
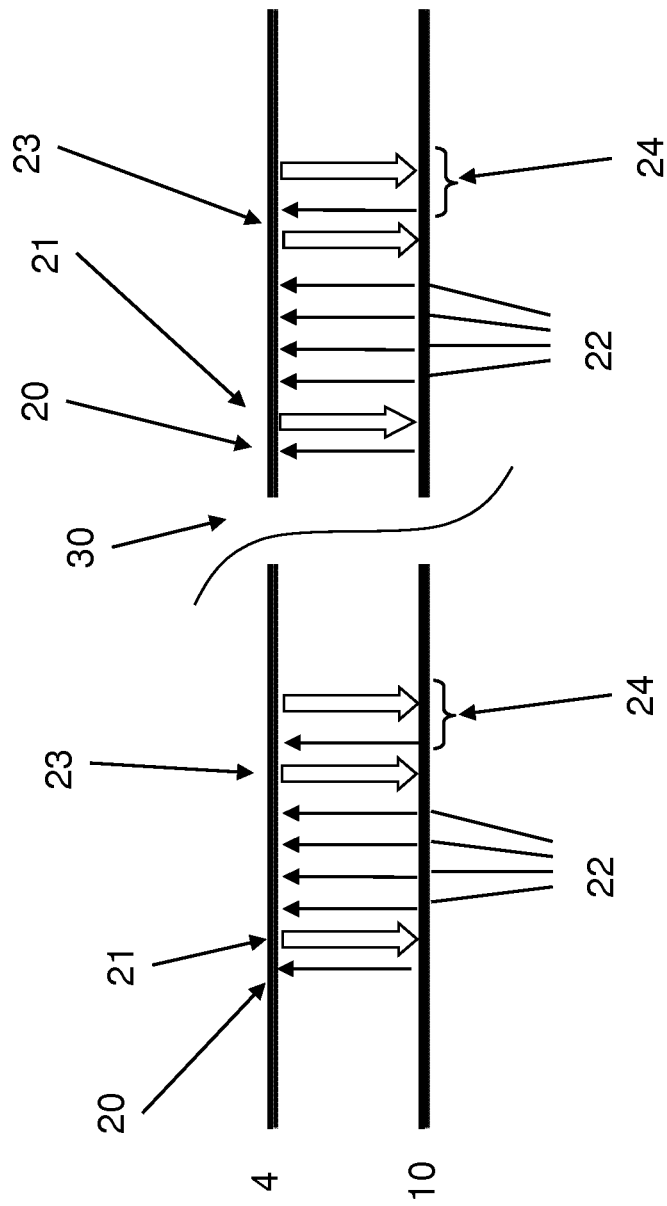
FIG. 2 shows the time bar of uplink communication from a wireless device where the invention is dedicated for to a base node according to prior art.

FIG. 2 shows schematically the situation according to the prior art, how a wireless device 10, which is configured to transmit data in a periodicity related transmission mode, and the associated base node 4 are exchanging data in order to fulfil a regular sending task.

In FIG. 2 are visible time bars for the wireless device 10 and the base node 4. Arrows indicate a data transmission from one party to the other.

The wireless device is typically equipped with a clock resp. a timer which figures out, when a data transmission is due. In a preferred embodiment the wireless device 10 receives information about the schedule from the remote server. The remote server thus tries to avoid peaks where all supported wireless devices, even in different cells, are providing their data.

After the timer expired, the wireless device 10 prepares a data transmission task. For that the wireless device 10 in particular first sends a radio resource control (RRC) connection request message 20 on the random access channel (RACH) to the base node 4. In response the base node resp. the cellular network sets up a data connection and assigns resources on the physical uplink shared channel (PUSCH) for the requesting wireless device 10. If the requested resources are available the requesting wireless device is informed with a connection request response 21 on the physical downlink control channel about (PDCCH) the assigned uplink resources the wireless device 10 is now allowed to use. More messages between wireless device 10 and base node 4 or vice versa are possible until the wireless device 10 is in a position to transmit data.

The data transmission is indicated by the data messages 22 which are ready to be carried out on the physical uplink shared channel, resp. the logical dedicated traffic channels (DTCH).

The base node responds at least with an acknowledgement message 23 indicating if the transmission was successfully received. In particular the message 23 is sent in response for each received frame 22, or after a full data transmission. Finally the connection needs to be closed, which allows the base node 4 to release resources allocated for the wireless device 10. The close of the connection is additionally done with a couple of connection close messages 24 between the wireless device 10 and the base node 4.

After a break 30, which can last e.g. one hour, the same procedure with the same signalling overhead is done again.

If this is done for one wireless device 10 operating this way, the base node 4 and the cellular network 1 have no issues to support this special request. It is getting crucial if a large amount of wireless devices are acting the same way, moreover in parallel, and in particular if the payload data 22 are minimal. In this case the ratio between scheduling related signalling and payload gets less than favourable, and the resources of the base node reach fast their limits.

Figure 3:
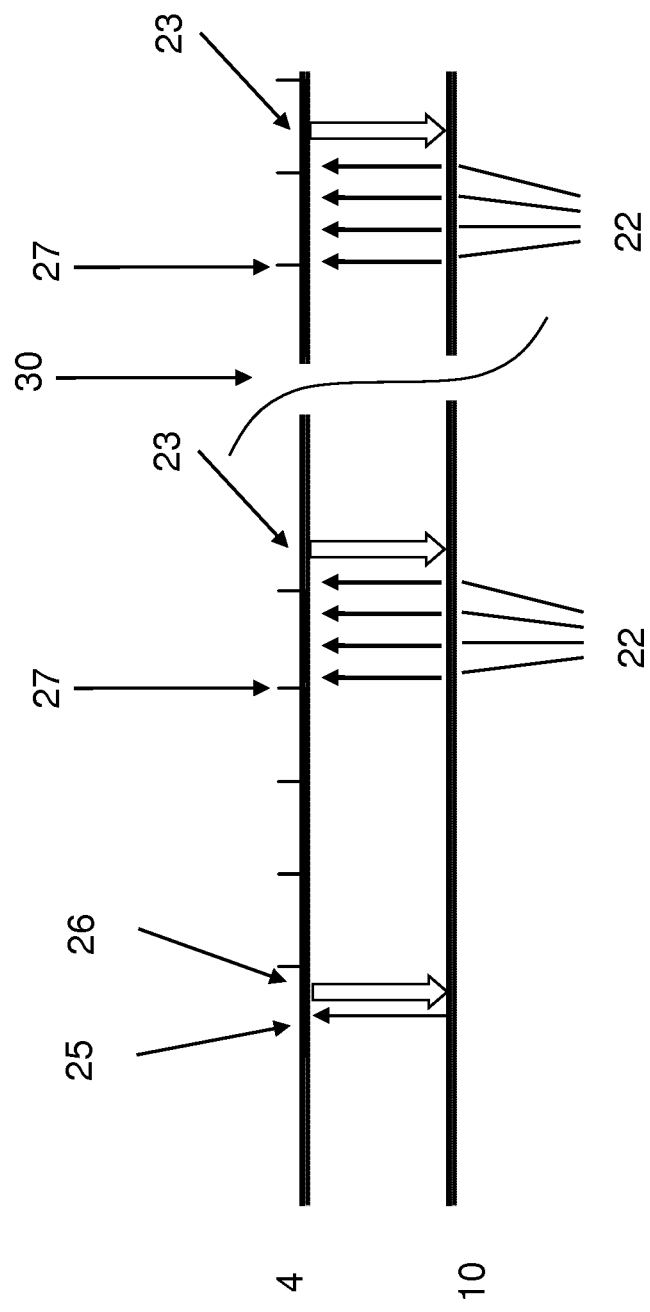
FIG. 3 represents the time bar for uplink communication between a wireless device and a base node according to a first embodiment of the invention.

FIG. 3 illustrates an exemplifying embodiment of the invention which is dedicated to resolve this addressed issues. To begin the process of periodic data transmission from the wireless device 10 to the base node 4 the wireless device is currently camping on, a message 25 is sent from the wireless device to the base node. Upon reception of that message 25 base node 4 preferably creates a context, starts a timer and sends a response 26 indicating to the wireless device 10 that resources will be allocated to the wireless device once the timer has expired. The timer is in particular defined by system frame number SFN.

With this response 26 both the wireless device 10 and the base node activate the periodicity related transmission mode instead of normal scheduled communication as shown in FIG. 2. Preferably the wireless device conducts further steps, in particular switch off mobility related measures. That means it assumes due to the fact that it is a stationary wireless device and it successfully camped on a base node, no cell-reselection is necessary for the time being.

When the timer expired at the respective system frame number 27, the base node 4 allocated the respective resources for receiving the data transmission expected from the wireless device. This means now the data transmission window of the wireless device is open.

With the data transmissions 22 the wireless device 10 now submits without further signalling exchange between the wireless device and the base node the data which are preferably dedicated for a remote server, e.g. the metering collection server.

Preferably the base node 4 acknowledges with acknowledge message 23 safe receipt of the transmitted data from the wireless device. Here this is displayed with one message 23 after the complete data transmissions 22, but an acknowledgement message per data transmission message 22 is as alternative solution also part of this embodiment of the invention.

Once the data transmission has concluded the timer is reset and the same operation is started after the same amount of system frames or a defined time 30. The next data transmission comprises the same message flow as the previously described. It is a matter of agreement between the wireless device and the base node, if the next timer is started at the end of the transmission, that is with message 23, or directly after expiry of the previous timer, that is at system frame number 27.

This procedure principally can go on until the wireless device is switched off. Alternatively the wireless device might notice that the amount of unsuccessful data transmissions increased. In that case the wireless device would send a message to the base node indicating a change of periodicity, in order to avoid peak times, where high traffic load is expected.

Alternatively or when previous measures are not successful, a message is sent to the base node indicating to end the periodic data transmission and activate cell-reselection.

Alternatively the wireless device has nothing to send for a foreseeable future. This also would lead to an end of the periodic data transmission. The wireless device informs the base node in particular with the so-called happy-bit defined as part of uplink control information to the base node about that nothing is left to send. Effectively the periodic data transmission is then ended, and reconvened when a remarkable amount of data are about to be sent.

Figure 4:
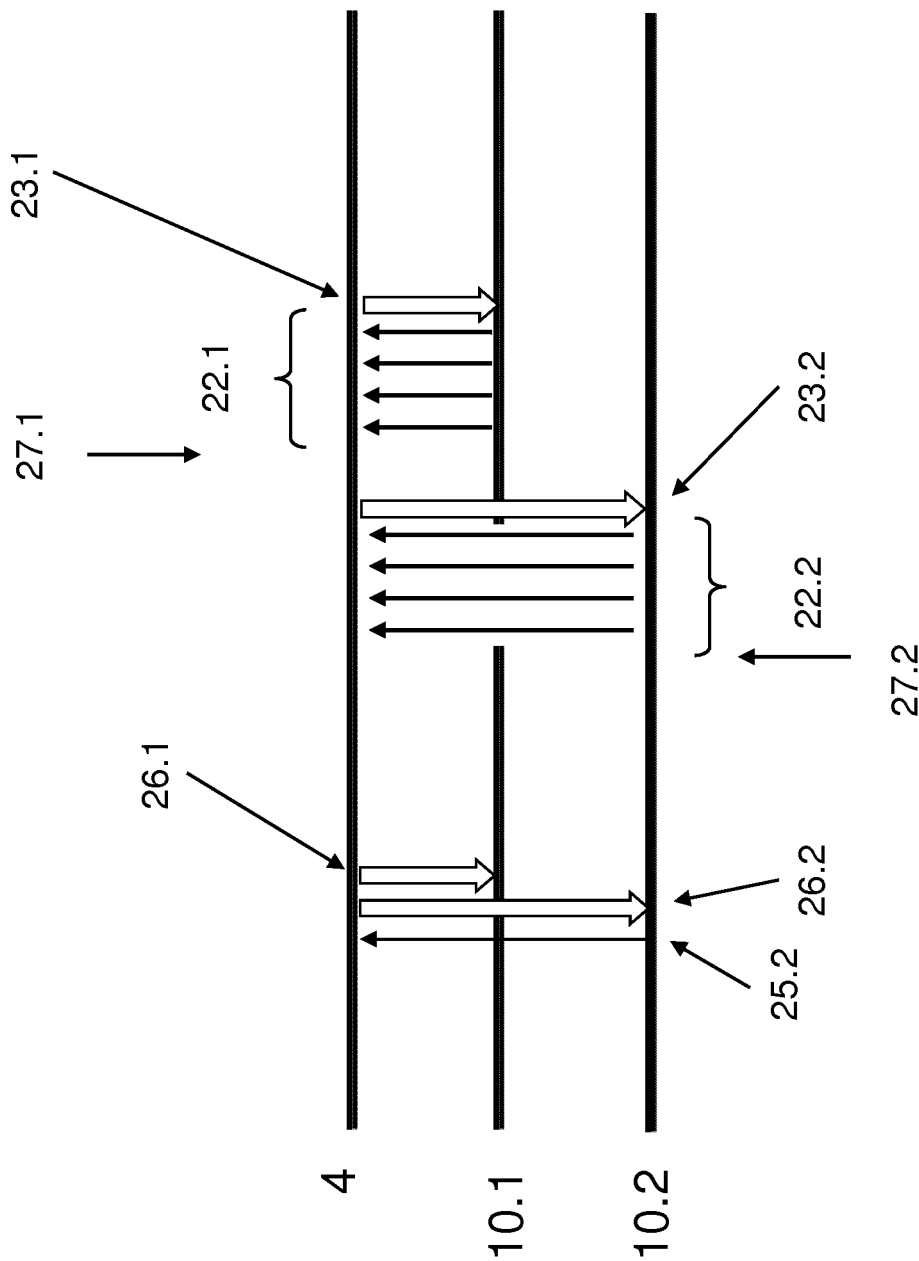
FIG. 4 represents the time bar for uplink communication between a group of wireless devices and a base node according to a second embodiment of the invention.

FIG. 4 shows the situation where—like indicated in FIG. 1b—more than one wireless device as part of a group of wireless device configured to operate in a common periodicity related transmission mode are situated in association with base node 4.

It is assumed that prior to the timeline shown in FIG. 4 for the first wireless device 10.1 the procedures shown in FIG. 3 were carried out. Now the situation occurs that a second wireless device 10.2 further wants to transmit data according to the periodicity related transmission mode, which is indicated with the message 25.2, which corresponds to message 25 from wireless device 10 in FIG. 3.

The base node 4 detects that due to this message the periodic scheduling of the wireless devices needs to be adapted. This adaptation in particular affects the scheduling of the first wireless device 10.1 which is already transmitting in a periodicity related transmission mode.

Hence, the base node 4 informs with response 26.2 the second wireless device about the assigned resource for periodic transmission.

Further in message 26.1 the first wireless device is informed about the adaptation of the periodic transmission. This adaptation in particular concerns the resource blocks and or the assigned size of the resource blocks which are allocated for the wireless device 10.1 once it sends. It is also foreseen that the time of transmission is adapted, which is only applicable if the cellular network resp. the base node has the duty to define the time of transmission for the wireless devices.

Hence, after message 26.1 is sent, both wireless devices 10.1, 10.2 are in the periodicity related transmission mode and at their respective frames 27.2 resp. 27.1 each wireless device transmits the data 22.2, 22.1 without further overhead signalling, and receive acknowledging messages 23.2, 23.1.

It is additionally foreseen that both wireless device send their data at the same time, either in different resource blocks of the same frame, or by sharing resource blocks. It is for this embodiment foreseen that the base node 4 schedules the periodic transmissions according to the available resources.

Figure 5:
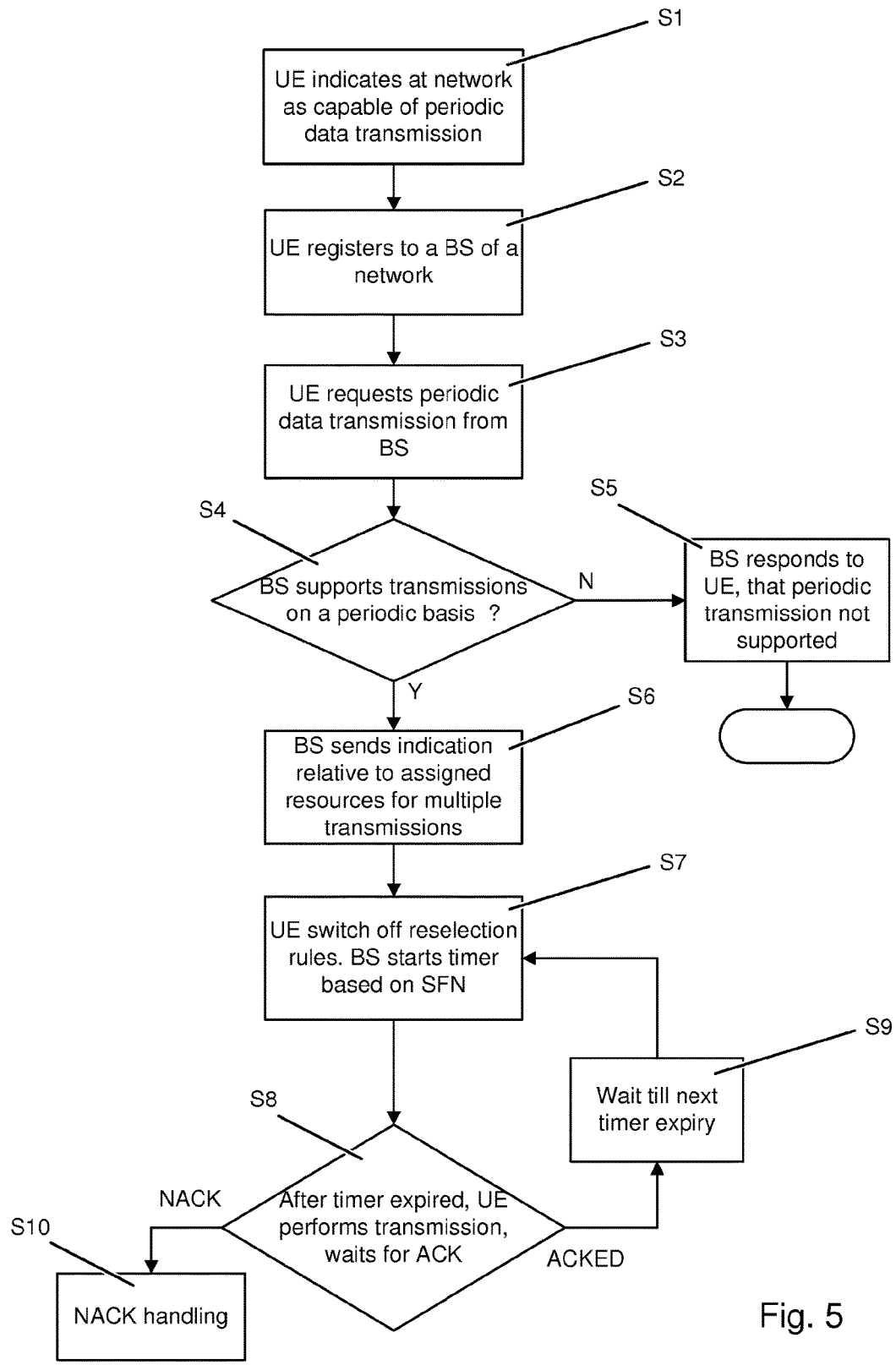
FIG. 5 shows a flow chart of an exemplifying embodiment of the inventive method.

In FIG. 5 the general workflow of a preferred embodiment of the invention is shown.

It starts in step S1 with an indication of the wireless device (UE) to the cellular network resp. the active base node (BS) that the wireless device is capable of periodic data transmissions. This information is in particular available in the wireless device, in particular the SIM, and provided to the active base node with the first registration of the wireless device at the base node as part of the capability message. Hence step S2, which is the registration of the wireless device at the base node falls together with step S1 in the described embodiment. Alternatively the information can also be already known in the cellular network i.e. in the Home Location Register (HLR), and thus provided by other means to the scheduling base node.

The procedure of data transmission is started in steps S3 with the message from the wireless device to the base node requesting periodic transmission. Due to the fact that not all base nodes might be ready to support this signalling means, first it is to be checked in step S4 if the base node is capable of periodic data reception according to this invention. If not, the information is provided within step S5 to the wireless device, and consequently a normal scheduled data transmission is continued.

If the base node supports periodic data transmission, then it sends in S6 a message indicating the assigned resource for multiple transmissions. Such message in particular comprises information relating to resource blocks, about the time based pattern, in particular about the offset of frames, in particular system frames relative to a system frame number, or the assigned size of resource blocks, which depicts the amount of data to be transmitted with one data transmission session. Step S3 to S6 are in particular part of a connection request, which leads to an either periodic transmission connection or a non-periodic transmission connection.

In response to message S6 the wireless device in step S7 activates the periodicity related transmission mode, which in particular comprises to switch off mobility related measures, in particular cell-reselection rules. Further a timer is set, at least at the base node, so that both the base node and the wireless device are at the same time ready to send reps. receive a data transmission. After the timer expired, in S8 the data transmission is carried out by the wireless device on the resources that were at the same time allocated by the base node.

Finally the acknowledging procedure needs to be executed. If the base node responds with an acknowledgement (ACK), the timer is reset and it is waited for the timer to expire again, then the procedure is repeated until the periodicity related transmission mode is ended. This is in particular based on the non-acknowledgement (NACK) handling. Therefore if the response from S8 is a NACK, the wireless device in conjunction with the base node needs to execute a NACK handling procedure.

Figure 6:
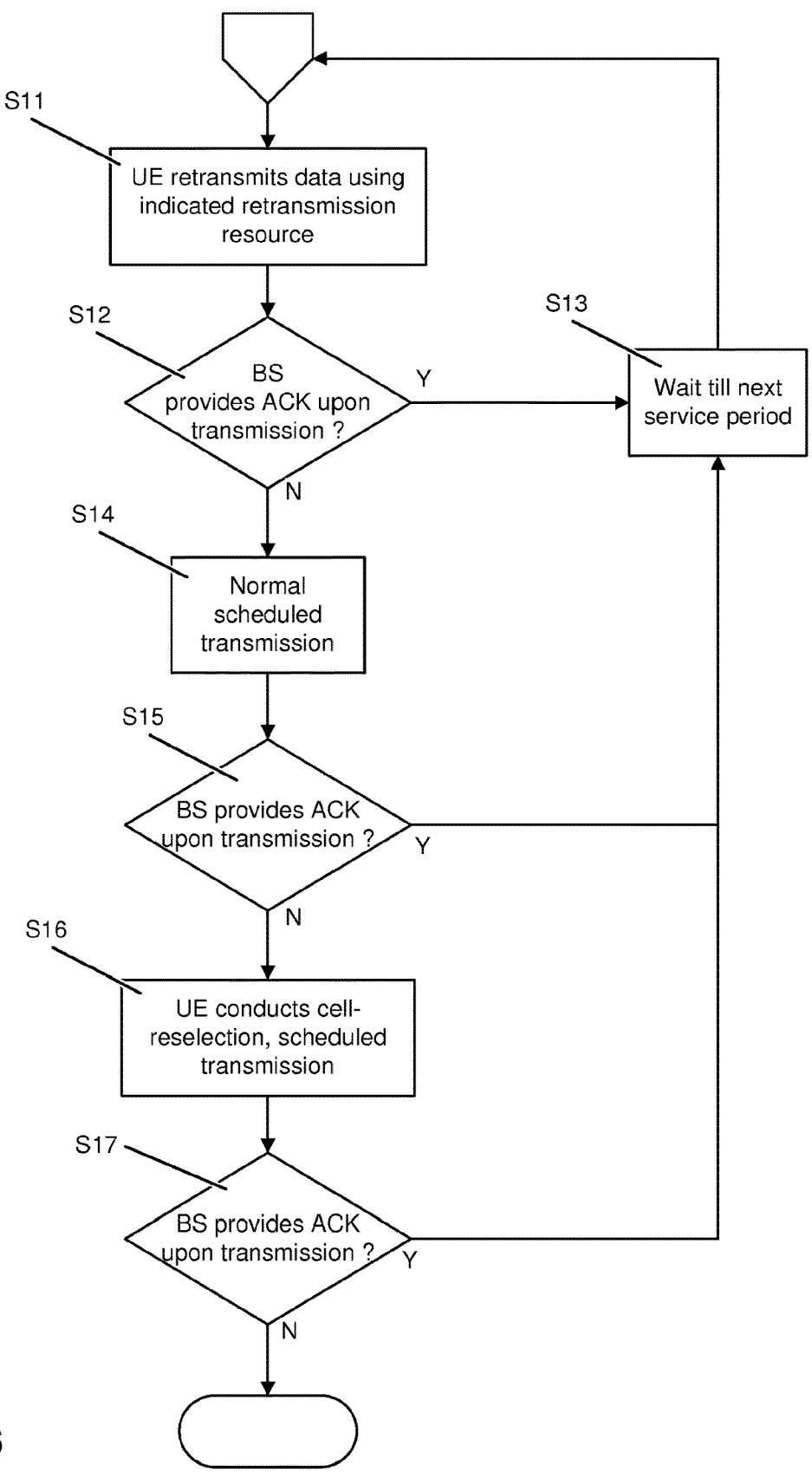
FIG. 6 shows a flow chart of another exemplifying embodiment of the inventive method.

A preferably NACK handling procedure is shown in FIG. 6. It in particular arrives after executing the procedure shown of FIG. 5 and details out step S10.

The purpose of the measures shown in FIG. 6 has as primary goal to assure that the data are submitted, and as a secondary goal to maintain a situation with reduced signalling in particular according to the inventive method.

Therefore it starts with step S11, which encompasses a retransmission of the data by using the initially assigned resources according to the periodicity related transmission mode. This option incorporates the two alternatives that immediately after a first transmission 22 the NACK response is received at the wireless device, and consequently that data are transmitted again by using assigned resource blocks. For this embodiment preferably in LTE and/or HSPA networks the response is part of the Hybrid Automatic Retransmission request (HARQ), provided on the Physical HARQ Indicator Channel (PHICH). So this already happens on the MAC layer, including the retry of data transmission.

Alternatively the retry of data transmission is done according to the next data transmission window, that is after the next time the timer expired. This has the advantage to reduce further signalling on the PHICH, as this can be omitted when only at the end of a complete data transmission window an ACK/NACK message is provided from the base node 4.

In S12 it is then checked if the retransmission was successful. If so, then the work flow branches to step S13, which means that the normal flow is entered again and the timer is reset and it is awaited that it expires. After that the process jumps again to FIG. 3, in particular to step S9.

Should the retry mechanism not be successful, then it branches to step S14, where in particular the normal scheduled data transmission mode is carried out. This on the first hand resolves minor degradations as the normal scheduled data transmission mode comprises prior to each data transmission a request for resources from the base node. The base node thus can react on high traffic situation and in extreme cases even reject the approval, which is a situation the wireless device can handle by standard measures.

It is again checked in step S15 if the submission in S16 was successful. If so it again branches to step S13. Practically it would be advantageous to once return to periodic transmission after the timer expired again. If this is again not successful, it is advantageous to switch off the periodicity related transmission mode, and after this is running well for a while, the process of FIG. 5 might be started again in step S6. This is to resolve e.g. timing synchronisation issues.

If also with the scheduled transmission the data are not successfully transmitted, the process branches to S16. For this the wireless device needs to switch on the cell-reselection capability. It is looked for a base node which is better capable of serving the wireless device. When the cell-reselection is successful it is again tried to transmit the data, preferably first in scheduled mode, and if that is successful a switch to the periodicity related transmission mode is carried out. If still the data transmission is not possible, then this is probably a question of coverage of the original base node and is not resolvable on the wireless devices side as long it is not moving. This is in particular the case for moving wireless devices or in case of changes on the base node side, e.g. an outage, maintenance or other measures. So this preferably embodiment of the inventive method is able to cope with this situation as well.

It is shown that in the shown embodiment of presently proposed invention a reduction of overhead signaling is reachable, while nevertheless there is no reduction in reliability of data transmission. The inventive method is therefore tailored for stationary wireless devices with low resource capabilities, where it is more important to get small amounts of data sent, than to have them sent in a momentary manner.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for data transmission in a cellular network from a wireless device, the cellular network comprising a plurality of base nodes, the plurality of base nodes comprising an active base node, which is the base node the wireless device is currently associated to, the wireless device being configured to transmit data according to a periodicity related transmission mode to the active base node, the wireless device further being operated stationary, the method comprises the steps of:
   providing information from wireless device to the active base node relating to periodicity of said data transmission,
   responding at the active base node to the wireless device comprising an indication relative to assigned resources for multiple transmissions,
   setting a timer at the active base node relating to said periodicity,
   upon expiration of the timer, reserving resources at the active base node for reception of the data transmission from the wireless device,
   transmitting data from the wireless device to the active base node according to the periodicity,
   receiving transmitted data at active base node, and
   conducting an acknowledging procedure at the active base node in response to said data reception.

2. Method according to claim 1, wherein the indication relative to assigned resources for multiple transmissions comprises at least one out of the group of:
   a time based submission pattern, and/or
   at least one resource block, and/or
   the assigned size of a resource block per transmission.

3. Method according to claim 1, wherein the method further comprises for the wireless device:
   providing information relating to periodicity of said data transmission in conjunction with a data transmission in a non-periodicity transmission mode, and said information relating to periodicity comprising a time related offset relative to said data transmission.

4. Method according to claim 1, wherein the wireless device is part of a group of devices comprising at least one second wireless device, both wireless devices operating in a common periodicity related transmission mode, wherein the method further comprises:
   the wireless device providing information relating to periodicity of said data transmission to the active base node, and
   said at least one second wireless device transmitting data to said active base node according to said periodicity.

5. Method according to claim 4, wherein said acknowledging procedure comprises:
   examining received data,
   in response to examination sending message indicative of the examination result to the first wireless device and to at least one second wireless device being part of said group.

6. Method according to claim 1, wherein the method further comprises:
   upon reception of a message from the active base node, the message indicating an unsuccessful reception of the data transmission, conducting at the wireless device at least one out of the following measures:
      retrying data transmission according to the periodicity, and/or
      retrying data transmission according to an additionally indicated resource, and/or
      transmitting a message to the active base node indicating an adaptation of the periodicity, and/or
      activating said non-periodicity transmission mode involving at least a resource request sent to active base node prior to data transmission.

7. Method according to claim 6, wherein in case the unsuccessfully received data transmission being transmitted by said wireless device and after activating said non-periodicity transmission mode, conducting the step of:
   retransmitting previously transmitted data according to the activated non-periodicity transmission mode from the wireless device to the active base node.

8. Base node of a cellular network, configured to associate a plurality of wireless devices operating in the cellular network, and operating stationary, and to receive a data transmission from at least one wireless device, the base node further comprises a timer, the base node being configured to:
   receive information from said wireless device relating to periodicity of said data transmission,
   transmit in response an indication relative to assigned resources for multiple transmissions to the wireless device,
   set the timer relating to said periodicity,
   upon expiration of the timer, reserve resources for reception of the data transmission from the wireless device,
   receive data transmitted according to said periodicity from said wireless device, and
   conduct an acknowledging procedure in response to said data reception.

9. Base node according to claim 8, further configured to receive information from wireless device comprising information relating to amount of expected data transmission, and in response to said received information leaving periodicity related transmission mode.

10. Base node according to claim 8, configured to receive information relating to periodicity of data transmission from a first wireless device being part of a group of devices and receiving data according to said periodicity from a second wireless device being part of said group of devices, further configured to conduct the acknowledging procedure, comprising:
    examine received data,
    in response to examination send message indicative of the examination result to first wireless device and to at least one second wireless device being part of said group.

11. Base node according to claim 8, wherein the base node is further configured to transmit after receiving data an adapted indication relative to assigned resources, the adapted indication comprises information related to at least one out of the group of:
    periodicity of transmission, and/or
    carrier frequency used for transmission and/or
    assigned size of a resource block per transmission.

12. Wireless device configured to operate with a base node according to claim 8, further being associated to said base node, the wireless device being operated stationary, the wireless device is configured to conduct transmission of data according to a periodicity related transmission mode to the active base node, said transmission comprises:
    to provide information to said base node relating to periodicity of said data transmission,
    to receive from the base node a response comprising an indication relative to assigned resource for multiple transmissions, and
    to transmit data to the base node according to said periodicity.

13. Wireless device according to claim 12, further configured to,
    after providing said information relating to periodicity of said data transmission, switch off mobility related measures, and
    upon reception of a message from the active base node indicating an unsuccessful reception of a data transmission, switch on mobility related measures.

14. Wireless device according to claim 12,
    being part of a group of devices comprising at least one other wireless device, both wireless devices operating in a common periodicity related transmission mode,
    wherein the wireless device is configured to provide information relating to periodicity of said data transmission to the base node, and said at least one other wireless device is transmitting data to said base node according to said periodicity.

15. Wireless device according to claim 12, wherein the wireless device is further configured, upon reception of a message from the base node, the message indicating an unsuccessful reception of the data transmission, to conduct at least one out of the following measures:
    retry data transmission according to the periodicity, and/or
    retry data transmission according to an additionally indicated resource, an/or
    transmit a message to the active base node indicating an adaptation of the periodicity, and/or
    activate said non-periodicity transmission mode involving at least a resource request sent to active base node prior to data transmission, and after activation of said non-periodicity transmission mode retransmit previously transmitted data according to the activated non-periodicity transmission mode to the active base node.

* * * * *